(12) United States Patent
Rogers et al.

(10) Patent No.: US 11,982,187 B1
(45) Date of Patent: May 14, 2024

(54) BLADE OUTER AIR SEAL WITH ANGLE-ORIENTED PLY LAYUP FOR CMC COMPOUND RADII

(71) Applicant: RAYTHEON TECHNOLOGIES CORPORATION, Farmington, CT (US)

(72) Inventors: Daniel S. Rogers, Lyman, ME (US); Joseph Micucci, Scarborough, ME (US); Peter J. Rosenfeld, Westport, MA (US); Giovanni Lawrence, Pawtucket, RI (US); Aaron Tomich, Sutton, MA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/085,864

(22) Filed: Dec. 21, 2022

(51) Int. Cl.
*F01D 11/08* (2006.01)
*F01D 5/28* (2006.01)

(52) U.S. Cl.
CPC .............. *F01D 11/08* (2013.01); *F01D 5/282* (2013.01); *F05D 2220/32* (2013.01); *F05D 2250/75* (2013.01); *F05D 2300/6033* (2013.01); *F05D 2300/6034* (2013.01)

(58) Field of Classification Search
CPC ........................................................ F01D 11/08
See application file for complete search history.

(56) References Cited

U.S. PATENT DOCUMENTS

| | | | |
|---|---|---|---|
| 10,196,918 B2 * | 2/2019 | McCaffrey | ............ F01D 25/28 |
| 10,370,986 B2 | 8/2019 | Heitman et al. | |
| 10,689,998 B2 | 6/2020 | Stapleton et al. | |
| 2019/0284947 A1 * | 9/2019 | Hock | ..................... F01D 25/24 |
| 2021/0131302 A1 * | 5/2021 | Roy Thill | .............. F01D 11/08 |

* cited by examiner

Primary Examiner — Michael L Sehn
(74) Attorney, Agent, or Firm — Carlson, Gaskey & Olds, P.C.

(57) ABSTRACT

A blade outer air seal arc segment includes a ceramic matrix composite body that defines a core gaspath side, a non-core gaspath side opposite the core gaspath side, a forward end, an aft end, and circumferential sides. The ceramic matrix composite body has first and second flanges on the non-core gaspath side. The ceramic matrix composite body is comprised of fiber plies disposed in a ceramic matrix. The fiber plies include flange fiber plies that have a +/−15-75 degree ply layup arrangement.

5 Claims, 2 Drawing Sheets

BLADE OUTER AIR SEAL WITH ANGLE-ORIENTED PLY LAYUP FOR CMC COMPOUND RADII

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a turbine section that has a first vane disposed about an engine axis, a second vane axially spaced from the first vane, and a blade axially between the first vane and the second vane. A blade outer air seal arc segment is situated radially outwardly of the blade. The blade outer air seal includes a ceramic matrix composite body that defines a core gaspath side facing the blade, a non-core gaspath side opposite the core gaspath side, a forward end, an aft end, and circumferential sides. The ceramic matrix composite body has first and second flanges on the non-core gaspath side. The ceramic matrix composite body is comprised of fiber plies disposed in a ceramic matrix. The fiber plies include flange fiber plies that have a +/−15-75 degree ply layup arrangement.

In a further embodiment of any of the foregoing embodiments, the flange fiber plies are configured in a U-shape and the bottom of the U-shape has a dual counter-arc.

In a further embodiment of any of the foregoing embodiments, the flange fiber plies have a +/−40-50 degree ply layup arrangement.

In a further embodiment of any of the foregoing embodiments, the flange fiber plies have a +/−45 degree ply layup arrangement.

In a further embodiment of any of the foregoing embodiments, the +/−15-75 degree ply layup arrangement is with respect to a warp direction of the flange fiber plies.

In a further embodiment of any of the foregoing embodiments, the +/−15-75 degree ply layup arrangement is with respect to a radial direction perpendicular to the engine axis.

A gas turbine engine article according to an example of the present disclosure includes a blade outer air seal arc segment that has a ceramic matrix composite body defining a core gaspath side, a non-core gaspath side opposite the core gaspath side, a forward end, an aft end, and circumferential sides. The ceramic matrix composite body has first and second flanges on the non-core gaspath side. The ceramic matrix composite body is comprised of fiber plies disposed in a ceramic matrix. The fiber plies include flange fiber plies that have a +/−15-75 degree ply layup arrangement.

In a further embodiment of any of the foregoing embodiments, the flange fiber plies at the bottom of the U-shape have a dual counter-arc.

In a further embodiment of any of the foregoing embodiments, the flange fiber plies are configured in a U-shape and the bottom of the U-shape has a dual counter-arc In a further embodiment of any of the foregoing embodiments, the flange fiber plies have a +/−15-75 degree ply layup arrangement.

In a further embodiment of any of the foregoing embodiments, the +/−15-75 degree ply layup arrangement is with respect to a warp direction of the flange fiber plies.

In a further embodiment of any of the foregoing embodiments, the +/−15-75 degree ply layup arrangement is with respect to a radial direction perpendicular to an engine axis.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
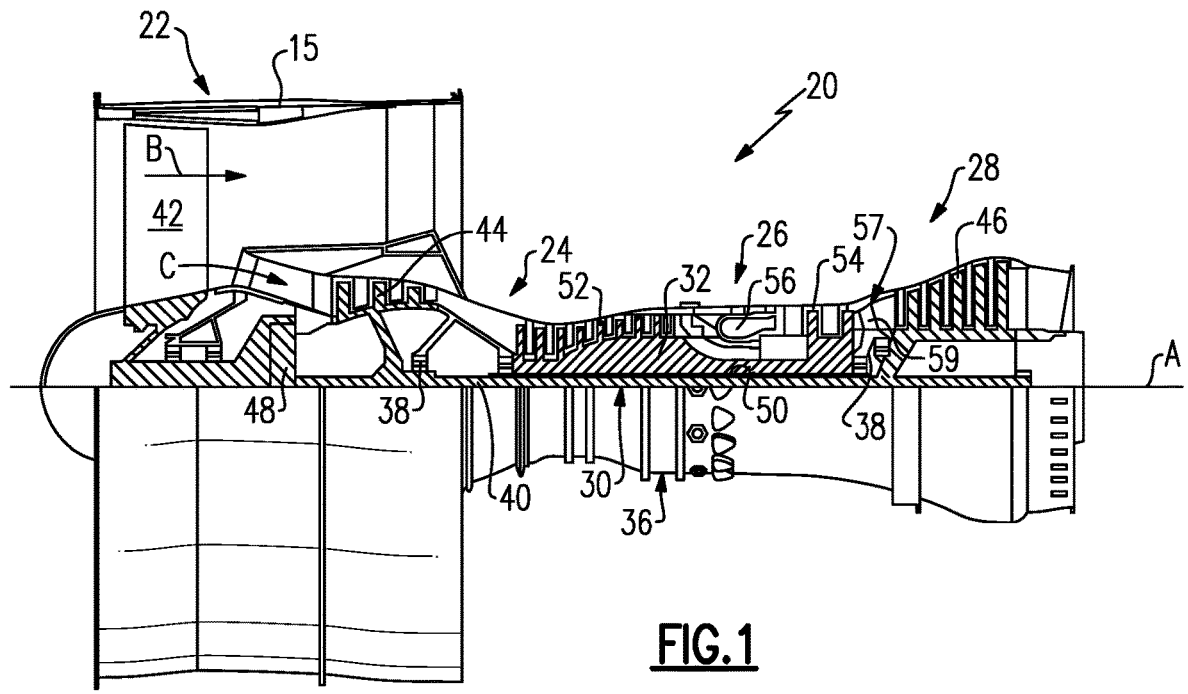
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
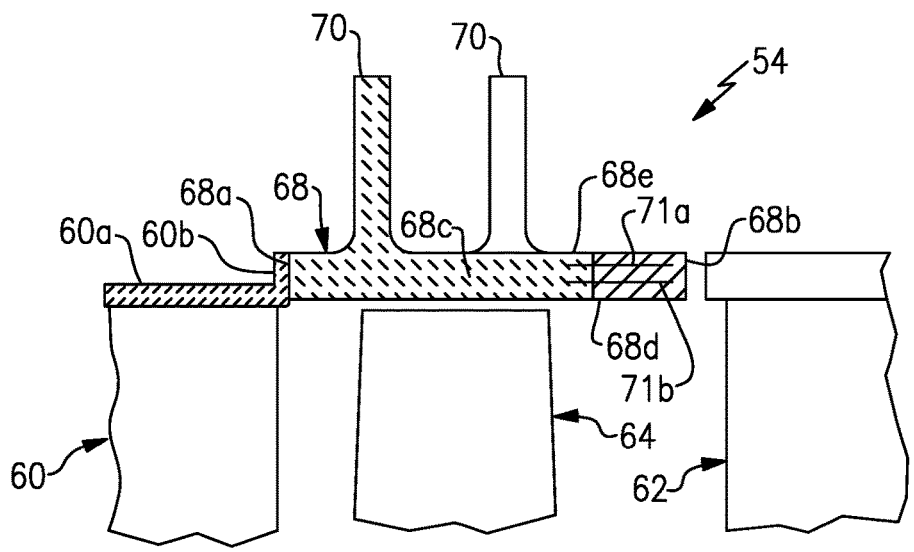
FIG. 2 illustrates a turbine section from the engine.

FIG. 2 illustrates a portion of the high pressure turbine 54 but is also applicable to the low pressure turbine 46. This section of the turbine 54 includes a row of vanes 60 and a second row of vanes 62 axially spaced from the first row of vanes 60. There is a row of rotatable blades 64 axially between the first row of vanes 60 and the second row of vanes 62. A row of blade outer air seal arc segments 66 ("BOAS 66") is located axially between the first row of vanes 60 and the second row of vanes 62. The BOAS 66 are arc segments in that they each are arced about the engine central axis A.

Each BOAS 66 is situated radially outwardly of the row of blades 64 and is comprised of a ceramic matrix composite body 68 ("CMC body 68"). A CMC material is comprised of ceramic fiber plies 71a in a ceramic matrix 71b. Example ceramic matrices are silicon-containing ceramic, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another. For example, the fiber plies 71a may have, but are not limited to, a harness satin weave. In a harness satin weave, the fill direction fibers extend over a plurality of warp direction fibers and then under one warp direction fiber. For instance, in an eight harness satin weave, the fill direction fibers extend over seven warp direction fibers, under one warp direction fiber, and then again over another seven warp direction fibers. As used herein, the angular orientation of a ply is with respect to its warp direction, e.g., in a +/−45 degree layup the warp direction fibers are oriented at 45 degrees to the reference zero direction (the radial direction in the engine 20).

The CMC body 68 defines a forward end 68a, an aft end 68b, circumferential sides 68c, a core gaspath side 68d facing the row of blades 64, and a non-core gaspath side 68e opposite the core gaspath side 68d. There is a pair of flanges 70 that project radially from the non-core gaspath side 68e. The flanges 70 may be substantially parallel to each other. The flanges 70 are not limited to, but may serve for, mounting the BOAS 68 in the engine 20, such as in a clevis joint or hook-type attachment.

The forward end 68a of the CMC body 68 abuts at least one of the vanes 60 of the first row of vanes 60. For instance, each of the vanes 60 includes a platform 60a with a radially-projecting flange 60b that the CMC body 68 bears against.

Figure 3:
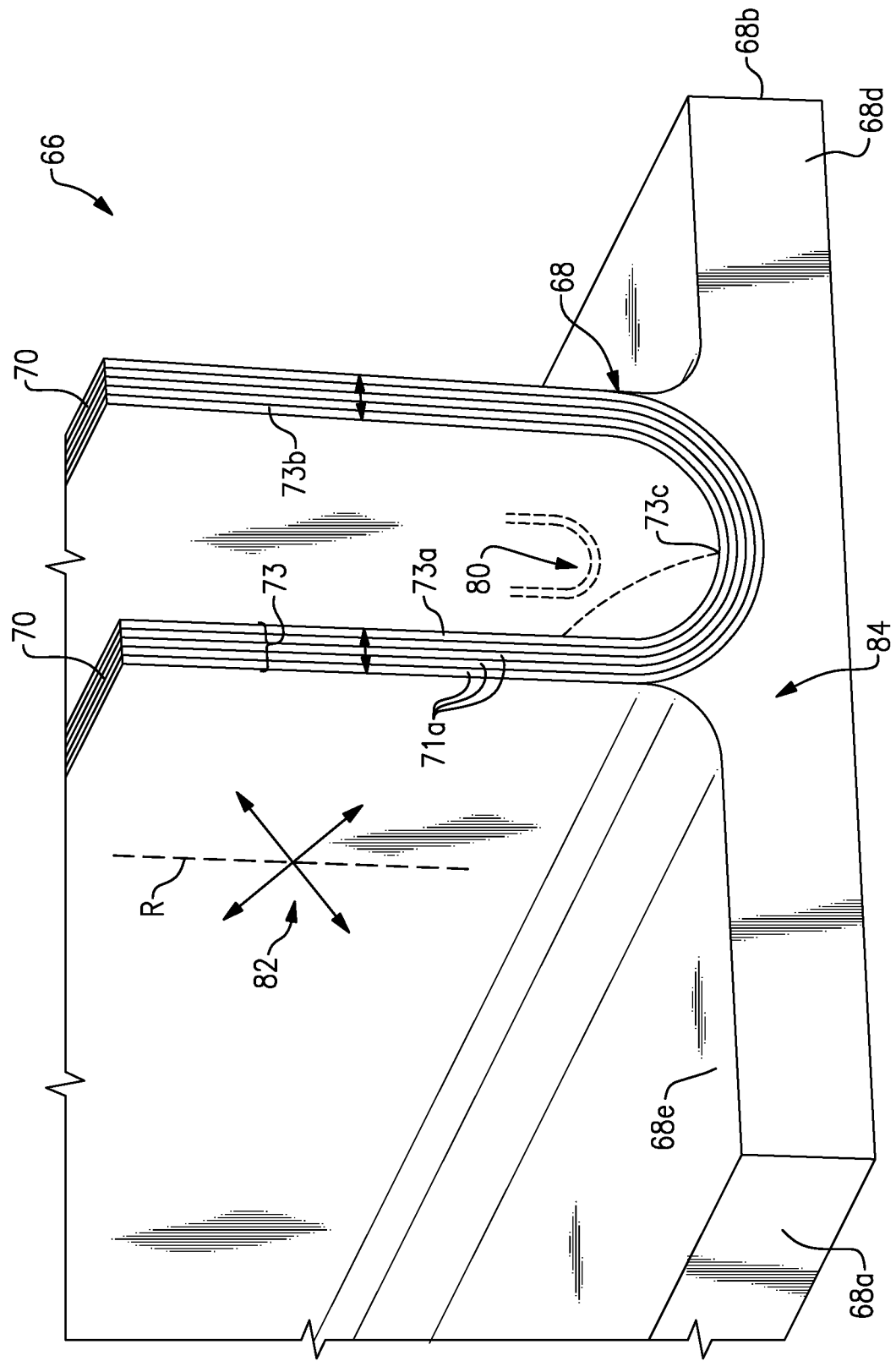
FIG. 3 illustrates the fiber ply layup of a blade outer air seal arc segment.

FIG. 3 illustrates the layup arrangement of the fiber plies 71a in the flanges 70. In general, the fiber plies 71a are comprised of flange fiber plies 73. Although not shown in detail, the remainder of the BOAS 66 may also be comprised of the fiber plies 71a. The flange fiber plies 73 form, at least in part, the flanges 70. As shown, the flange fiber plies 73 are configured in a U-shape (shaped like a capital letter U) in that there are two upright legs 73a/73b connected by a bottom wall 73c. To form the U-shape, the flange fiber plies 73 bend at the sides of the bottom wall 73c to transition into the legs 73a/73b. As the fibers are ceramic, the plies 73 are somewhat stiff and limited in the amount of bend before the fibers break or crimp. In particular, the bottom wall 73c has a dual counter arc, represented at 80. That is, the bottom wall 73c has a radially inwardly-facing arc that curves about the engine axis A and a radially outwardly-facing arc that curves in the bend of the U-shape. Due to the compound nature of the dual counter arc 80, there is considerable difficulty in laying-up the flange fiber plies 73 without breakage, crimping, or kinking.

To facilitate mitigation of these concerns, the flange fiber plies 73 have a +/−15-75 degree ply layup arrangement, which is represented at 82. As indicated above, the angular orientations are given with respect to the warp directions of the fiber plies 71a versus a reference zero direction, which here is the radial direction R. In the +/−15-75 degree ply layup arrangement, the flange fiber plies 73 are arranged in alternating orientations. As examples, a +/−15 layup would have alternating plies of +15 degrees and −15 degrees, and a +/−75 layup would have alternating plies of +75 degrees and −75 degrees. In such orientations, the fibers of the flange fiber plies 73 are oblique to the each of the two bending directions of the dual counter arc 80 and can thus bend substantially helically rather than circularly. This permits the fibers, and thus the flange fiber plies 73, to more gradually bend through the dual counter arc 80 without substantial breakage, crimping, or kinking, thereby maintaining greater ply integrity in the final BOAS 66 and enabling enhanced producibility. In further examples, the flange fiber plies 73 have a layup arrangement of +/−40-50 degrees to further facilitate helical bending of the fibers. For instance, for "purely helical" bending in which neither the warp or weft fibers are biased toward the zero direction, the layup arrangement may be +/−45 degrees. Conversely, orientations below 15 degrees or above 75 degrees are not expected to be as effective.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
  a turbine section including,
    a first vane disposed about an engine axis, a second vane axially spaced from the first vane, and a blade axially between the first vane and the second vane;
    a blade outer air seal arc segment situated radially outwardly of the blade, the blade outer air seal including a ceramic matrix composite body defining a core gaspath side facing the blade, a non-core gaspath side opposite the core gaspath side, a forward end, an aft end, and circumferential sides, the ceramic matrix composite body having first and second flanges on the non-core gaspath side,
  the ceramic matrix composite body being comprised of fiber plies disposed in a ceramic matrix, the fiber plies including flange fiber plies that have a harness satin weave including fill direction fibers and warp direction fibers, the flange fiber plies have a +/−15-75 degree ply layup arrangement of the warp direction fibers with respect to a reference zero radial direction perpendicular to the engine axis, and the flange fiber plies are configured in a U-shape and the bottom of the U-shape has a dual counter-arc.

2. The gas turbine engine as recited in claim 1, wherein the flange fiber plies have a +/−40-50 degree ply layup arrangement.

3. The gas turbine engine as recited in claim 1, wherein the flange fiber plies have a +/−45 degree ply layup arrangement.

4. The gas turbine engine as recited in claim 1, wherein the fill direction fiber and the warp direction fibers of the flange fiber plies are oblique to the each of two bending directions of the dual counter arc.

5. A gas turbine engine article comprising:
  a blade outer air seal arc segment including a ceramic matrix composite body defining a core gaspath side, a non-core gaspath side opposite the core gaspath side, a forward end, an aft end, and circumferential sides, the ceramic matrix composite body having first and second flanges on the non-core gaspath side;
  the ceramic matrix composite body being comprised of fiber plies disposed in a ceramic matrix, the fiber plies including flange fiber plies that have a +/−15-75 degree ply layup arrangement with respect to a radial direction perpendicular to an engine axis, the flange fiber plies are configured in a U-shape with a first upright leg of the U-shape forming the first flange and a second upright leg of the U-shape forming the second flange, and the flange fiber plies at the bottom of the U-shape have a dual counter-arc.

\* \* \* \* \*